(12) United States Patent
Kim et al.

(10) Patent No.: US 9,595,709 B2
(45) Date of Patent: Mar. 14, 2017

(54) ANODE ACTIVE MATERIAL HAVING HIGH CAPACITY AND LITHIUM SECONDARY BATTERY COMPRISING THE SAME

(71) Applicant: LG CHEM, LTD., Seoul (KR)

(72) Inventors: Jihyun Kim, Daejeon (KR); Jae Hyun Lee, Daejeon (KR); SooHyun Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 627 days.

(21) Appl. No.: 13/863,616

(22) Filed: Apr. 16, 2013

(65) Prior Publication Data

US 2013/0330597 A1    Dec. 12, 2013

(30) Foreign Application Priority Data

Apr. 17, 2012 (KR) .................. 10-2012-0039709

(51) Int. Cl.
| | |
|---|---|
| *H01M 4/36* | (2006.01) |
| *H01M 4/485* | (2010.01) |
| *H01M 10/052* | (2010.01) |
| *H01M 10/0525* | (2010.01) |
| *H01M 10/0565* | (2010.01) |

(52) U.S. Cl.
CPC ........... *H01M 4/364* (2013.01); *H01M 4/485* (2013.01); *H01M 10/052* (2013.01); *H01M 10/0525* (2013.01); *H01M 10/0565* (2013.01); *Y02E 60/122* (2013.01)

(58) Field of Classification Search
CPC .. H01M 4/364; H01M 4/485; H01M 10/0525; H01M 10/0565; Y02E 60/122
See application file for complete search history.

(56) References Cited

U.S. PATENT DOCUMENTS

| | | | |
|---|---|---|---|
| 2003/0082453 A1* | 5/2003 | Numata | H01M 4/40 429/231.95 |
| 2013/0189583 A1* | 7/2013 | Lee | H01M 4/38 429/231.1 |

FOREIGN PATENT DOCUMENTS

| | | | |
|---|---|---|---|
| JP | 2012-212669 | * | 11/2012 |
| KR | 10-2011-0139172 A | | 12/2011 |

* cited by examiner

*Primary Examiner* — Laura Weiner
(74) *Attorney, Agent, or Firm* — Birch, Stewart, Kolasch & Birch, LLP

(57) ABSTRACT

Disclosed are an anode active material comprising a lithium metal oxide, and a metal powder reacting with lithium ions present in an electrolyte to form a lithium alloy, or a metal oxide, the metal powder or the metal oxide having a content of not lower than 1% by weight and not higher than 30% by weight, based on the total weight of an anode mix, and a lithium secondary battery comprising the same.

9 Claims, No Drawings

ANODE ACTIVE MATERIAL HAVING HIGH CAPACITY AND LITHIUM SECONDARY BATTERY COMPRISING THE SAME

CROSS REFERENCE TO RELATED APPLICATIONS

This application claims priority to Korean Patent Application No. 10-2012-0039709 filed on Apr. 17, 2012, the content of which is herein incorporated by reference in its entirety.

TECHNICAL FIELD

The present invention relates to a repeatedly chargeable/dischargeable lithium secondary battery, and an anode active material constituting the lithium secondary battery.

BACKGROUND ART

Depletion of fuel cells has brought about a great increase in price of energy sources and increased interest in environmental pollution. Eco-friendly alternative energy sources are a necessity for the next generation. In this regard, a great deal of research into power production methods such as nuclear energy, sunlight, wind power and tidal power is underway and power storage devices for efficiently utilizing the produced energy also attract much attention.

In particular, regarding lithium secondary batteries, an increase in technological development and demand associated with mobile equipment has led to a sharp increase in demand for lithium secondary batteries as energy sources. Recently, use of lithium secondary batteries as power sources of electric vehicles (EVs) and hybrid electric vehicles (HEVs) has become popularized and usage thereof is expanding to applications such as auxiliary power supply through grid-realization.

An anode of a conventional lithium secondary battery generally utilizes a carbon-based compound which enables reversible intercalation and deintercalation of lithium ions while maintaining structural and electric properties as an anode active material. On the other hand, recently, rather than conventional carbon-based anode materials, a great deal of research associated with anode materials obtained through lithium alloy reaction using silicon (Si) and tin (Sn), and lithium titanium oxides is underway.

Lithium titanium oxide ($Li_4Ti_5O_{12}$) is known as a zero-strain material that suffers minimal structural deformation during charge/discharge, exhibits considerably superior lifespan, does not cause generation of dendrites and has considerably superior safety and stability. In addition, lithium titanium oxide electrodes are greatly advantageous as they can be quickly charged within several minutes.

Lithium titanium oxide has disadvantages of high potential and low capacity, as compared to conventional carbon-based anode materials.

Silicon- and tin-based metal materials are known to have high capacity, but disadvantageously exhibit great variation in volume when reacting with lithium.

DISCLOSURE

Technical Problem

Therefore, the present invention has been made to solve the above and other technical problems that have yet to be resolved.

As a result of a variety of extensive and intensive studies and experiments to solve the problems as described above, the present inventors found that, when an anode active material is designed by mixing a metal powder or a metal oxide with lithium metal oxide, the metal powder or metal oxide in a predetermined content range does not cause volume changes through reaction with lithium. The present invention has been completed based on this discovery.

Technical Solution

In accordance with one aspect of the present invention, provided is an anode active material comprising: a lithium metal oxide intercalating or deintercalating lithium ions while maintaining a crystal structure during charge and discharge; and a metal powder reacting with lithium ions present in an electrolyte to electrochemically form a lithium alloy, or a metal oxide intercalating or deintercalating the lithium ions, wherein each of the metal powder and the metal oxide has a content of not lower than 1% by weight and not higher than 30% by weight, based on the total weight of an anode mix.

The lithium metal oxide is preferably represented by the following Formula 1:

$$Li_aM'_bO_{4-c}A_c \quad (1)$$

wherein M' is at least one element selected from the group consisting of Ti, Sn, Cu, Pb, Sb, Zn, Fe, In, Al and Zr;

a and b are determined according to an oxidation number of M' within ranges of $0.1 \leq a \leq 4$ and $0.2 \leq b \leq 4$;

c is determined according to an oxidation number within a range of $0 \leq c < 0.2$; and A is at least one monovalent or bivalent anion.

The oxide of Formula 1 is represented by the following Formula 2:

$$Li_aTi_bO_4 \quad (2)$$

wherein $0.5 \leq a \leq 3$ and $1 \leq b \leq 2.5$.

The lithium metal oxide may be $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$ or the like, but is not limited thereto.

In a non-limiting embodiment of the present invention, the lithium metal oxide may be $Li_{1.33}Ti_{1.67}O_4$ or $LiTi_2O_4$. $Li_{1.33}Ti_{1.67}O_4$ has a spinel structure which undergoes little change in crystal structure during charge and discharge and is highly reversible.

The lithium metal oxide may be prepared by a method well-known in the art, for example, a solid phase method, a hydrothermal method, a sol-gel method or the like and a detailed explanation thereof is omitted.

The lithium metal oxide may be provided as a secondary particle formed of agglomerated primary particles.

The secondary particle may have a particle diameter of 200 nm to 30 μm.

When the particle diameter of the secondary particles is less than 200 nm, adhesivity may be deteriorated during production of the anode. Since use of a greater amount of binder is required in order to solve this problem, energy density is poor. When the particle diameter of the secondary particle exceeds 30 μm, it is disadvantageously difficult to obtain high power due to low diffusion rate of lithium ions.

When the content of the metal powder is lower than 1% by weight, based on the total weight of the anode mix, it is difficult to improve capacity of the anode active material, and when the content is 30% by weight or more, performance may be disadvantageously deteriorated due to change in volume caused by intercalation and deintercalation of lithium ions.

Specifically, the content of the metal powder may be within a range of not lower than 1% by weight and not higher than 15% by weight, based on the total weight of the anode mix. Specifically, the metal powder is a powder of one or more metals selected from the group consisting of Al, Si, Sn, Pb, In, Bi, Sb, Ga, and Ge.

The content of the metal oxide may be within a range of not lower than 3% by weight and not higher than 30% by weight, based on the total weight of the anode mix.

Specifically, the metal oxide is an oxide of a Group 3B to 5A transition metal, a post-transition metal or a metalloid on the periodic table. More specifically, the metal oxide may be at least one selected from the group consisting of SiO, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $V_2O_5$, $Nb_2O_5$, $TiO_2$, $MoO_2$, and $WO_2$.

The present invention provides a lithium secondary battery in which an electrode assembly comprising an anode comprising the anode active material, a cathode, and a polymer membrane and having a structure in which the polymer membrane is interposed between the cathode and the anode is accommodated in a battery case. The lithium secondary battery may comprise a lithium salt-containing non-aqueous electrolyte. The lithium secondary battery may be a lithium ion battery, a lithium ion polymer battery or a lithium polymer battery. The lithium secondary battery may comprise a lithium alloy which is electrochemically formed through reaction with lithium ions present in an electrolyte.

The cathode or the anode may be fabricated by a method including the following processes.

The method for producing the electrode comprises:

dispersing or dissolving a binder in a solvent to prepare a binder solution;

mixing the binder solution with an electrode active material and a conductive material to prepare an electrode mix slurry;

coating the electrode mix slurry onto a current collector;

drying the electrode; and rolling (pressing) the electrode to a predetermined thickness.

In some cases, the method may further comprise drying the rolled electrode.

In this specification, the electrode mix may mean an anode material having a solid phase, excluding a solvent.

In the process of preparing the binder solution, the binder solution is prepared by dispersing or dissolving the binder in the solvent.

The binder may be any binder well known in the art and, specifically, the binder may be selected from the group consisting of fluorine resins, polyolefines, styrene butadiene rubbers, carboxymethyl cellulose, mussel proteins (dopamines), silanes, ethylcellulose, methylcellulose, hydroxypropylcellulose, polyethylene glycol, polyvinyl alcohol, and acrylic copolymers.

The solvent may be selected depending on the type of binder and examples thereof include organic solvents such as isopropyl alcohol, N-methylpyrrolidone (NMP) and acetone, water and the like.

In a specific embodiment of the present invention, a binder solution for a cathode may be prepared by dispersing/dissolving PVdF in N-methylpyrrolidone (NMP) and a binder solution for an anode may be prepared by dispersing/dissolving styrene-butadiene rubber (SBR)/carboxy methyl cellulose (CMC) in water.

The electrode mix slurry may be prepared by mixing the electrode active material and the conductive material with the binder solution or dispersing the electrode active material and conductive material therein. The electrode mix slurry thus prepared is transported to a storage tank and stored prior to coating. The electrode mix slurry may be continuously stirred in the storage tank in order to prevent the electrode mix slurry from hardening.

In the production method of the electrode, the electrode active material may be a cathode active material or an anode active material.

Specifically, examples of the anode active material include: layered compounds such as lithium cobalt oxide ($LiCoO_2$) and lithium nickel oxide ($LiNiO_2$), or these compounds substituted by one or more transition metals; lithium manganese oxides such as compounds represented by $Li_{1+y}Mn_{2-y}O_4$ (in which $0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-y}M_yO_2$ (M=Co, Mn, Al, Cu, Fe, Mg, B or Ga, and $0.01 \leq y \leq 0.3$); lithium manganese composite oxides represented by $LiMn_{2-y}M_yO_2$ (M=Co, Ni, Fe, Cr, Zn or Ta, and $0.01 \leq y \leq 0.1$), or $Li_2Mn_3MO_8$ (M=Fe, Co, Ni, Cu or Zn); $LiMn_2O_4$ wherein a part of Li is substituted by an alkaline earth metal ion; disulfide compounds; $Fe_2(MoO_4)_3$ and the like.

In a specific embodiment of the present invention, the electrode active material may comprise a lithium metal oxide having a spinel structure represented by the following Formula 3 as a cathode active material:

$$Li_xM_yMn_{2-y}O_{4-z}A_z \qquad (3)$$

wherein $0.9 \leq x \leq 1.2$, $0 < y < 2$, and $0 \leq z \leq 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or bivalent anion.

A maximum substitution amount of A is lower than 0.2 mol %. In a specific embodiment, A may be at least one anion selected from the group consisting of halogens such as F, Cl, Br and I, S and N.

The substitution of the anions improves bonding force to the transition metal and prevents structural deformation of the compound, thus improving battery lifespan.

On the other hand, when a substitution amount of the anion A is excessively high ($t \geq 0.2$), lifespan characteristics may be disadvantageously deteriorated due to incomplete crystal structure formation.

Specifically, the oxide of Formula 3 may be a lithium metal oxide represented by the following Formula 4:

$$Li_xNi_yMn_{2-y}O_4 \qquad (4)$$

wherein $0.9 \leq x \leq 1.2$, and $0.4 \leq y \leq 0.5$.

More specifically, the lithium metal oxide may be $LiNi_{0.5}Mn_{1.5}O_4$ or $LiNi_{0.4}Mn_{1.6}O_4$.

The anode active material is the same as described above.

Any conductive material may be used without particular limitation so long as it has suitable conductivity without causing adverse chemical changes in the battery. Examples of conductive materials include: graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The electrode mix slurry may further comprise an additive such as a filler, as necessary. The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Coating the current collector with the electrode mix slurry is a process of coating an electrode mix slurry on a current collector to a given thickness at a predetermined pattern by passing the electrode mix slurry through a coater head.

Coating the current collector with the electrode mix slurry is carried out by placing the electrode mix slurry on the current collector and then homogeneously dispersing the electrode mix slurry using a doctor blade. The coating method includes die casting, comma coating or screen printing. In addition, the electrode mix slurry may be adhered to the current collector by pressing or lamination after forming the electrode mix slurry on a separate substrate.

There is no particular limit as to the current collector, so long as it has suitable conductivity without causing adverse chemical changes in the fabricated battery. Examples of the current collector include copper, stainless steel, aluminum, nickel, titanium, sintered carbon, and copper or stainless steel which has been surface-treated with carbon, nickel, titanium or silver, and aluminum-cadmium alloys. The cathode current collector may be processed to form fine irregularities on the surface thereof so as to enhance adhesion to the cathode active materials. In addition, the cathode current collectors may be used in various forms including films, sheets, foils, nets, porous structures, foams and non-woven fabrics. Specifically, the cathode current collector may be a metal current collector including aluminum and the anode current collector may be a metal current collector including copper. The electrode current collector may be a metal foil, e.g., an aluminum (Al) foil or a copper (Cu) foil.

In the drying process, the solvent and moisture present in the slurry are removed in order to dry the slurry coated on the metal current collector. In a specific embodiment, the drying may be carried out in a vacuum oven at 50 to 200° C. within one day.

After drying, the method may further include cooling. The cooling may include slow cooling at room temperature in order to facilitate recrystallization of the binder.

After completion of coating, the electrode may be compressed to a desired thickness by passing the electrode between two rolls heated at a high temperature in order to improve capacity density of the electrode and adhesivity between the current collector and the active material. This is referred to as a rolling process.

Before passing the electrode between two rolls heated at a high temperature, the electrode may be pre-heated. In the pre-heating process, the electrode is heated before being added to the roll in order to improve compression effects of the electrode.

The rolled electrode may be dried in a vacuum oven at 50 to 200° C. which is a temperature not lower than a melting point of the binder, within one day. The rolled electrode may be dried after being cut to a predetermined length.

After drying, the method may further include cooling. The cooling may include slow cooling at room temperature in order to facilitate recrystallization of the binder.

As the separator, an insulating thin film having high ion permeability and mechanical strength is used. The separator typically has a pore diameter of 0.01 to 10 μm and a thickness of 5 to 300 μm.

As the separator, sheets or non-woven fabrics, or craft papers made of an olefin polymer such as polypropylene and/or glass fibers or polyethylene, which have chemical resistance and hydrophobicity, are used.

Typical examples of commercially available products for the separator may include Celgard series such as Celgard® 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

The electrode assembly may include all electrode assemblies with a structure well known in the art such as jellyroll electrode assemblies (or winding-type electrode assemblies), stack electrode assemblies (or lamination-type electrode assemblies) and stack & folding electrode assemblies.

In this specification, it will be understood that the stack & folding electrode assembly includes a stack & folding-type electrode assembly produced by placing a unit cell having a structure in which a separator is interposed between the cathode and the anode on a separator sheet, and folding or winding the separator sheet.

In addition, the electrode assembly may include an electrode assembly having a structure in which the cathode and the anode are laminated by heat-fusion such that one of the cathode and the anode is interposed between separators.

As the non-aqueous electrolyte, a non-aqueous electrolytic solution, an organic solid electrolyte and an inorganic solid electrolyte may be utilized.

Examples of the non-aqueous electrolytic solution include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2$ NLi, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The lithium secondary batteries according to the present invention may be used for battery cells as power sources of small-sized devices and as unit batteries of middle- or large-sized battery modules comprising a plurality of battery cells.

In addition, the present invention provides a battery pack comprising the battery module as a power source of a medium or large sized device. Preferably, examples of medium or large sized devices include electric vehicles including electric vehicles (EVs), hybrid electric vehicles (HEVs) and plug-in hybrid electric vehicles (PHEVs), power storage systems and the like.

Configurations of battery modules and battery packs, and fabrication methods thereof are well known in the art and a detailed explanation thereof is thus omitted in this specification.

Effects of the Invention

As apparent from the fore-going, a lithium secondary battery according to the present invention comprises an anode active material obtained by mixing a predetermined amount of metal powder that reacts with lithium ions present in an electrolyte, based on the total weight of an anode mix, to electrochemically form a lithium alloy, or a predetermined amount of metal oxide intercalating or deintercalating the lithium ions with a lithium metal oxide, thereby advantageously achieving improved capacity.

DETAILED DESCRIPTION OF THE INVENTION

Now, the present invention will be described in more detail with reference to the following examples. These examples are provided only to illustrate the present invention and should not be construed as limiting the scope and spirit of the present invention.

Example 1

$Li_{1.33}Ti_{1.67}O_4$, a Si powder (particle size: 100 nm, capacity: 1,800 mAh/g, efficiency: 75%), carbon black, PVDF and NMP were weighted such that a weight ratio thereof was 87:3:5:5:85 and mixed to prepare an electrode mix slurry.

The electrode mix slurry was applied to a thickness of 80 μm on an aluminum foil with a thickness of 20 μm. The resulting structure was rolled such that a porosity reached 40% and dried at 60° C. for 24 hours to produce an electrode.

The electrode was punched in the form of a coin, and a coin-type battery was produced using a lithium metal as a counter electrode, a polyethylene membrane (Celgard, thickness: 20 μm) as a separator, and a carbonate electrolyte consisting of ethylene carbonate (EC) and propylene carbonate (PC) at a ratio of 1:1 and further containing 1M $LiPF_6$ as a salt, as an electrolyte.

Example 2

A battery was produced in the same manner as in Example 1, except that $Li_{1.33}Ti_{1.67}O_4$, SiO (particle size: 100 nm, capacity: 1,350 mAh/g, efficiency: 79%), carbon black, PVDF and NMP were weighted such that a weight ratio thereof was 85:5:5:5:85 and mixed to prepare an electrode mix slurry.

Comparative Example 1

A battery was produced in the same manner as in Example 1, except that $Li_{1.33}Ti_{1.67}O_4$, carbon black, PVDF and NMP were weighted such that a weight ratio thereof was 90:5:5:85 and mixed to prepare an electrode mix slurry.

Comparative Example 2

A battery was produced in the same manner as in Example 1, except that $Li_{1.33}Ti_{1.67}O_4$, Si powder (particle size: 100 nm, capacity: 1,800 mAh/g, efficiency: 75%), carbon black, PVDF and NMP were weighted such that a weight ratio thereof was 74:16:5:5:85 and mixed to prepare an electrode mix slurry.

Comparative Example 3

A battery was produced in the same manner as in Example 1, except that graphite was used as the anode active material, instead of $Li_{1.33}Ti_{1.67}O_4$ and rolling was carried out such that a porosity reached 30%.

Comparative Example 4

A battery was produced in the same manner as in Comparative Example 1, except that graphite was used as the anode active material, instead of $Li_{1.33}Ti_{1.67}O_4$, and rolling was carried out such that porosity reached 30%.

Comparative Example 5

A battery was produced in the same manner as in Example 2, except that $Li_{33}Ti_{1.67}O_4$, a Si powder (particle size: 100 nm, capacity: 1350 mAh/g, efficiency: 79%), carbon black, PVDF and NMP were weighted such that a weight ratio thereof was 58:32:5:5:85 and mixed to prepare an electrode mix slurry.

Experimental Example 1

The batteries of Examples 1 and 2, and Comparative Examples 1 to 5 were charged at a temperature of 25° C. and at a charge current of 0.1 C to a final charge voltage of 2.0V and were discharged at a discharge current of 1 C to a final discharge voltage of 0.005V, and capacity per unit weight of the batteries was measured. Results are shown in Table 1.

TABLE 1

|  | Capacity (mAh/g) |
| --- | --- |
| Ex. 1 | 165 mAh/g |
| Ex. 2 | 226 mAh/g |
| Comp. Ex. 1 | 160 mAh/g |
| Comp. Ex. 2 | 400 mAh/g |
| Comp. Ex. 3 | 353 mAh/g |
| Comp. Ex. 4 | 350 mAh/g |
| Comp. Ex. 5 | 480 mAh/g |

Experimental Example 2

The batteries of Examples 1 and 2, and Comparative Examples 1 to 5 were charged at a temperature of 25° C. and at a charge current of 0.1 C to a final charge voltage of 2.0V, and were discharged at a discharge current of 0.1 C to a final discharge voltage of 0.005V and variation in electrode thickness during charge/discharge was measured using a micrometer after the battery was disassembled in a glove box, washed with water in DMC for 30 minutes and dried for one hour or longer. Results are shown in Table 2.

TABLE 2

|  | Variation in electrode thickness during charge/discharge (%) |
| --- | --- |
| Ex. 1 | 0.3% |
| Ex. 2 | 0.3% |
| Comp. Ex. 1 | 0.2% |
| Comp. Ex. 2 | 17.8% |
| Comp. Ex. 3 | 12.5% |
| Comp. Ex. 4 | 12.0% |
| Comp. Ex. 5 | 22.3% |

Experimental Example 3

The batteries of Examples 1 and 2, and Comparative Examples 1 to 5 were charged at a temperature of 45° C. and at a charge current of 0.1 C to a final charge voltage of 2.0V, and were discharged at a discharge current of 1 C to a final discharge voltage of 0.005V. After 300 charge/discharge cycles, increase in resistance was measured. The resistance increase was calculated by dividing voltage drop by a given current after discharging the batteries at SOC of 50% and at 1 C-rate for 10 seconds. Results are shown in Table 3.

TABLE 3

|  | Increase in resistance (%) |
| --- | --- |
| Ex. 1 | 2% |
| Ex. 2 | 97% |
| Comp. Ex. 1 | 2% |
| Comp. Ex. 2 | 67% |
| Comp. Ex. 3 | 15% |
| Comp. Ex. 4 | 10% |
| Comp. Ex. 5 | 88% |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An anode active material comprising:
   a lithium metal oxide; and
   (a) a metal powder of Si reacting with lithium ions present in an electrolyte to form a lithium alloy, or
   (b) a metal oxide,
   the metal oxide having a content of not lower than 1% by weight and not higher than 30% by weight, based on the total weight of an anode mix,
   wherein the content of the metal powder is not lower than 1% by weight and is not higher than 3% by weight, based on the total weight of the anode mix, and
   wherein the metal oxide is at least one selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $V_2O_5$, $Nb_2O_5$, $TiO_2$, and $WO_2$,
   wherein the lithium metal oxide is provided as a secondary particle formed of agglomerated primary particles, and the secondary particle has a particle diameter of 200 nm to 30 μm,
   wherein the lithium metal oxide is represented by the following Formula 2:

$$Li_aTi_bO_4 \qquad (2),$$

wherein 0.5≤a≤3 and 1≤b≤2.5.

2. The anode active material according to claim 1, wherein the content of the metal oxide is not lower than 3% by weight and is not higher than 30% by weight, based on the total weight of the anode mix.

3. The anode active material according to claim 1, wherein the lithium metal oxide is $Li_{1.33}Ti_{1.67}O_4$ or $LiTi_2O_4$.

4. An anode, comprising the anode active material according to claim 1.

5. A lithium secondary battery comprising an electrode assembly inserted into a battery case, wherein the electrode assembly comprises an anode comprising the anode active material according to claim 1, a cathode and a polymer membrane, and has a structure in which the polymer membrane is interposed between the cathode and the anode.

6. The lithium secondary battery according to claim 5, wherein the lithium secondary battery is a lithium ion battery.

7. The lithium secondary battery according to claim 5, wherein the lithium secondary battery is a lithium ion polymer battery.

8. A battery pack comprising the lithium secondary battery according to claim 5.

9. A device comprising the battery pack according to claim 8 as a power source.

* * * * *